United States Patent
Alhadef et al.

(10) Patent No.: US 7,187,401 B2
(45) Date of Patent: Mar. 6, 2007

(54) SYSTEM AND A METHOD OF THREE-DIMENSIONAL MODELING AND RESTITUTION OF AN OBJECT

(75) Inventors: Bernard Alhadef, Le Castellet (FR); Laurent Alhadef, Paris (FR)

(73) Assignees: Yodea, Paris (FR); BGA, Le Castellet (FR)

( * ) Notice: Subject to any disclaimer, the term of this patent is extended or adjusted under 35 U.S.C. 154(b) by 591 days.

(21) Appl. No.: 10/369,530

(22) Filed: Feb. 21, 2003

(65) Prior Publication Data
US 2003/0202089 A1  Oct. 30, 2003

(30) Foreign Application Priority Data
Feb. 21, 2002  (FR)  ................. 02 02246

(51) Int. Cl.
*H04N 15/00* (2006.01)
(52) U.S. Cl. ...................................................... 348/42
(58) Field of Classification Search ............ 348/42–46, 348/96–97, 157, 74; 700/90; 396/324; 702/150; 382/154; *H04N 15/00*
See application file for complete search history.

(56) References Cited
U.S. PATENT DOCUMENTS 5,568,152 A * 10/1996 Janky et al. ........... 342/357.08
5,815,411 A * 9/1998 Ellenby et al. ............. 702/150
5,864,481 A * 1/1999 Gross et al. ................ 700/90
6,611,664 B2 * 8/2003 Kochi et al. ................ 396/324
6,650,360 B1 * 11/2003 Osen ........................... 348/157

FOREIGN PATENT DOCUMENTS

WO   WO 98 10246 A   3/1998

* cited by examiner

*Primary Examiner*—Tung Vo
(74) *Attorney, Agent, or Firm*—Miles & Stockbridge, P.C.; Edward J. Kondracki

(57) ABSTRACT

A system for three-dimensionally modeling and restitution a subject, the system comprising a housing suitable for being carried in the hand by an operator, the housing having an optical unit with stereoscopic digital video cameras co-operating with an inertial navigation unit having a trihedron of optical fiber gyros and a trihedron of accelerometers for generating position and displacement signals in a frame of reference. The housing may also include, in particular, a telemeter laser, an infrared video camera, a GPS unit, inclinometers, and tri-flux magnetometers. A second subassembly connected to the housing by an optical and/or electrical connection cable contains an electrical power supply, electronic circuits, and a microcomputer for processing signals delivered by the housing and for generating a three-dimensional model of the subject, implementing a photogrammetric technique.

18 Claims, 3 Drawing Sheets

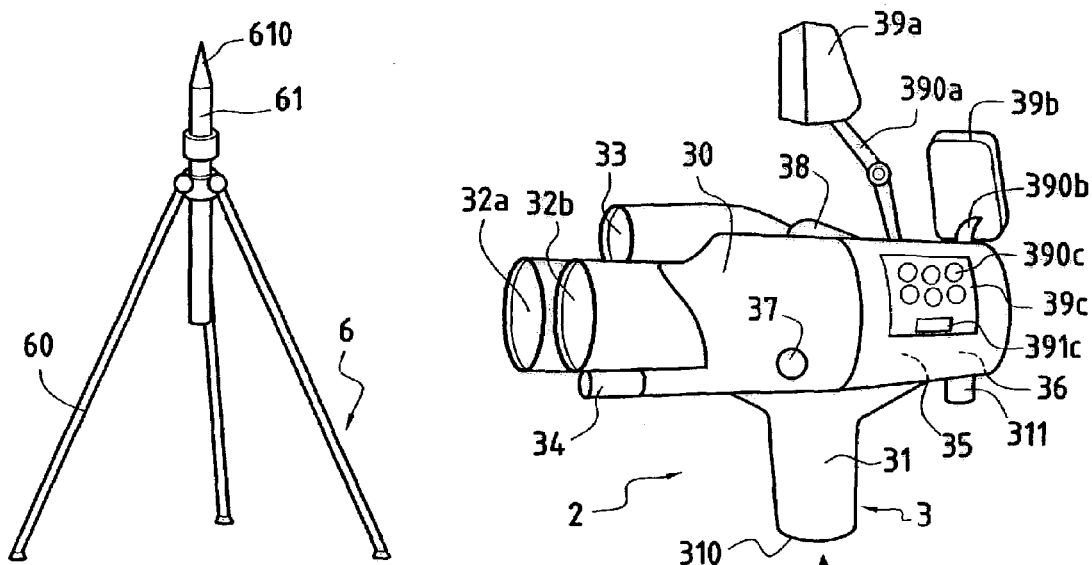
FIG. 2D
FIG. 2A
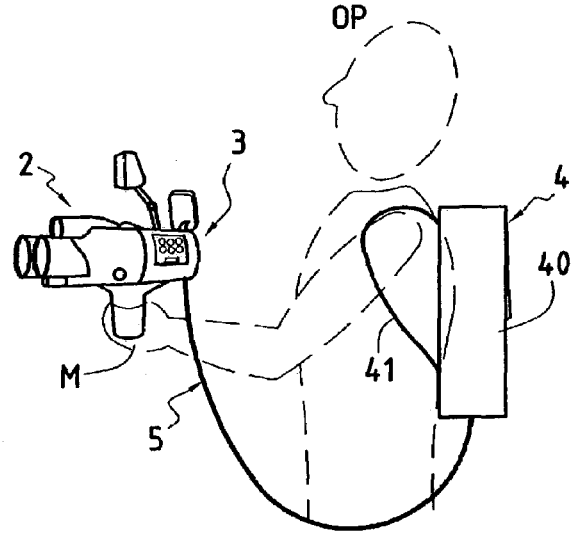
FIG. 2B
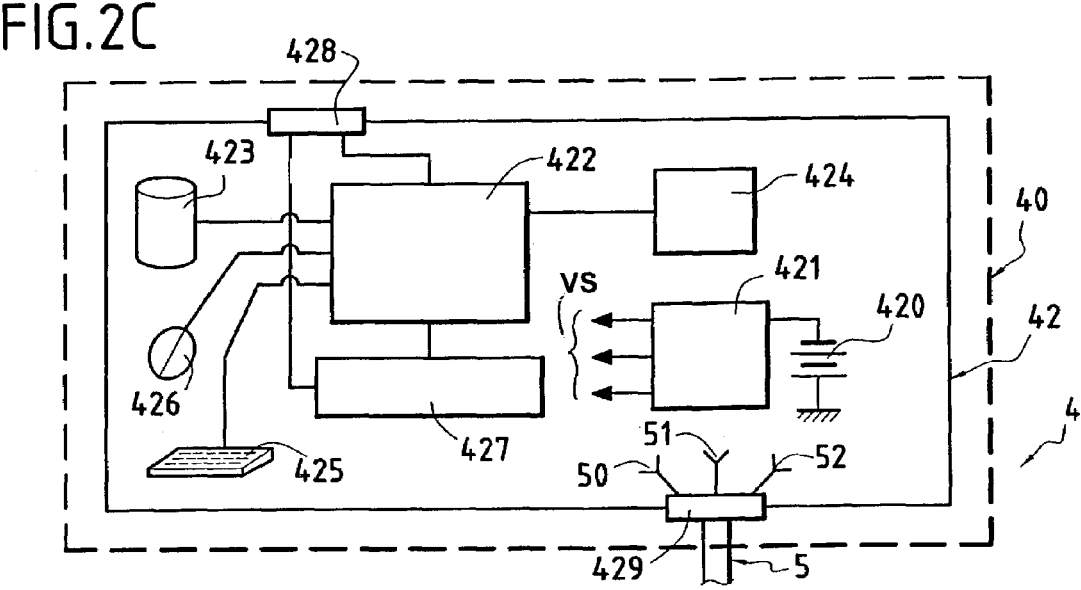
FIG. 2C

SYSTEM AND A METHOD OF THREE-DIMENSIONAL MODELING AND RESTITUTION OF AN OBJECT

The invention relates to a system for three-dimensional modeling and restitution of an object.

The invention also relates to a method of modeling an object in three dimensions by implementing the system of the invention.

More particularly, the invention applies to a system that is lightweight and self-contained, implementing in particular a so-called "photogrammetric" technique.

BACKGROUND OF THE INVENTION

Before outlining the characteristics of prior art systems and methods and describing the systems and methods that are specific to the invention in greater detail, it is appropriate to begin by briefly summarizing the main characteristics of the above-mentioned photogrammetric technique, with reference to FIG. 1 accompanying the present description.

Photogrammetry is a technique for determining the shape, the dimensions, and the position of an object, on the basis of perspective views of said object recorded using photographic methods.

In the context of the invention, the term "object" should be considered in its broadest meaning: it may be constituted by an object proper, or else, for example, by a scene in space (landscape, etc.).

In the example shown in FIG. 1, the object 1 in question is a jug. The coordinates of each point, e.g. P1 (x1,y1,z1) and P2 (x2,y2,z2) of the object 1 can be referenced in an orthogonal frame of reference XYZ.

A three-dimensional photograph of an object is based on a perspective cone constituted by the set of rays converging on a viewpoint (e.g. O1 or O2) from each point on the surface of the object (e.g. P1 (x1,y1,z1) and P2 (x2,y2,z2)) and intersecting a plane (e.g. S1 or S2). A perspective cone is defined by the position on a photograph (plane S1 or S2 in the example of FIG. 1), of the foot (e.g. PP1 or PP2) of the perpendicular dropped from O1 on S1 or from O2 on S2, of length C1 or C2, respectively. Thus, if two cones are known relating to two different viewpoints O1 and O2 from which two photographs S1 and S2 have been taken, the position [x1,y1,z1] of point P1 of the object 1 can be defined as the locus of the points of intersection of corresponding pairs of rays O1P11P1 and O2P12P1, where P11 is the point of intersection of the ray P1O1 with the plane S1 and P12 is the point of intersection of the ray P1O2 with the plane S2. Similarly, the position [x2,y2,z2] of the point P2 on the object 1 is defined as the locus of the point of intersection of corresponding pairs of rays: O1P21P2 and O2P22P2, where P21 is the point of intersection between the ray P2O1 and the plane S1 and P22 is the point of intersection between the ray P2O2 and the plane S2. The distance D is the distance between the points O1 and O2.

To obtain good quality measurements and to enable the image to be processed automatically in a manner that is fast, accurate, and reliable, it is necessary to have available the precise characteristics of the photographs whose principal characteristics are listed below:

the locations of the images: it is essential to know the coordinates of the image planes (S1 and S2), their inclinations in three dimensions (azimuth, elevation, and roll angles), and the positions of the centers of the images; and the optical characteristics of the camera. An accurate photograph is defined as being an exact central projection with its projection center being situated at a distance referenced c below from a "principal" point. The parameters of the corresponding simplified mathematical and geometrical model, i.e. the principal distance c and the image coordinates of the principal point, referred to below as PP(i0, ç0), are referred to as the internal orientation elements. This ideal representation is nevertheless not an accurate reflection of reality. Account needs to be taken of errors caused by the lenses, the camera chambers, and the photographs themselves used in association with the camera in order to obtain the required high level of accuracy.

From the above, it is important to know with precision:

the coordinates of the main point PP(i0, ç0) on the images: it is important to define these coordinates since the main points serve as the point of origin in the frame of reference of the image. This frame of reference is essential for defining the projections which are to be used for establishing the positions of photographed objects;

the errors due to the optical system: these errors degrade measurement quality (chromatic aberration, spherical aberration, coma, astigmatism, field curvature, distortion, etc.);

the aperture of the lens: the smaller the aperture of the lens the greater the precision of the points in the image, the image is said to be "sharp". During photogrammetric restitution, it is necessary to have a projection center, and its size can be taken as being a point (in theory only a single light ray can pass). Unfortunately, the size of the projection center depends on the size of the aperture while the picture is being taken. It is therefore necessary to minimize aperture size while taking pictures, to a value that is as small as possible while nevertheless allowing enough light to pass to illuminate the image;

the principal distance: to prepare the step of modeling by photogrammetric restitution, it is necessary to know accurately the principal distance c for each image. Unfortunately, this distance varies during focusing. In order to obtain a sharp image of a near object, it is necessary to vary the distance between the lens and the camera sensor, for example a charge-coupled device (CCD) type semiconductor sensor. Similarly, if there is a change in the focal length, c is modified;

outlining: one of the traditional difficulties in the technique of photogrammetry is the problem of outlining the objects to be modelled. Outlining is constituted by the action of correctly analyzing the outline of the object to be modelled. The photogrammetric technique gives rise to errors of parallax if measurements (of position, etc.) are not taken with sufficient accuracy. This has a great effect on the outlining of objects. There can be confusion between the points on the outline of the object and points on objects that are in fact situated behind the looked-for outline. To solve this problem, it is useful to determine the differences in field depth for the various objects to be modelled; and number of images: the greater the number of characterizing images, the finer the accuracy of measurements after the stage of photogrammetric reconstruction.

Photogrammetry finds applications in numerous fields which can arbitrarily be subdivided into four main categories as summarized briefly below:

1. Very large-scale applications: for applications of this type, it is a question of making three-dimensional measurements over extents ranging from infinity to several kilometers. This is essentially the kind of photogrammetry implemented by artificial satellites, e.g. orbiting around the earth. Ground surface relief is reconstructed by the photogrammetric technique. Scale lies typically in the range 1/50,000 to 1/400,000. The term "space-grammetry" can be used. The most usual applications are as follows: map-making, surveying, earth sciences (studying ice; avalanches; air flows; swell; tides; etc.).

2. Large-scale applications: an important application of photogrammetry is drawing up topographical maps and plans from aerial photography. It is generally applied to the base level survey maps of a country (at scales that vary, depending on region, over the range 1/5000 to 1/200,000) and to the surveying that is required for civil engineering work, water works, town planning, land registry, etc.

3. Human scale applications: here the idea is to obtain three-dimensional measurements of objects or extents lying in the range a few kilometers to a few centimeters. There are numerous fields of application such as: inspecting works of art; determining the volumes of mines and quarries; applications associated with the automobile industry (e.g. the geometrical characteristics of bodywork), hydraulics (waves, water movements), plotting trajectories and studying the travel of vehicles, analyzing traffic and accident reports, drawing up plans for computer-assisted design (CAD) techniques, quality control, machining, establishing dimensions, and architectural and archeological surveying.

4. Applications at microscopic scale: here the idea is to obtain three-dimensional measurements of objects ranging in size from a few millimeters to a few micrometers. Fields of application include: biology, microgeology, micromechanics, etc.

The present invention relates more particularly, but not exclusively, to applications in the third category, i.e. applications at a "human" scale.

In this category of applications, various systems and methods have been proposed in the prior art. Without being exhaustive, the main solutions are summarized below.

There exist systems provided with one or more cameras positioned on robots or on articulated arms. With systems of that type it is indeed possible to achieve good accuracy, however they generally present rather numerous drawbacks that can be summarized as follows: the equipment is heavy and difficult to transport, its range of action is small, its cost is high, the system can only be used by specialists since it is complex to operate, and image processing is laborious and subject to error.

There exist systems that make use of optical targets. Optical targets are placed after metrology on the object or in the space that is to be modelled so as to facilitate subsequent processing using them as references, and then the positions of the camera(s) is/are measured for each picture taken. By way of example, such systems are available from the suppliers "Blom Industry" and "GSI". Such systems give good accuracy and lead to fewer processing errors than systems of the above type. Nevertheless, that does not mean they are free from drawbacks, and in particular they suffer from the following: they are difficult and lengthy to implement since it is necessary to install expensive targets, the field of measurement is limited to the area where the targets have been installed, and once again that type of system is suitable for use only by specialists since it is complex to operate.

There exist systems that make use of light of multichromatic characteristic. One or more cameras are placed at locations that have been properly identified in advance. Chromatic light is projected on the object (several beams of different colors). That technique is limited in practice to objects of small dimensions only. Similarly, in practice, its use is restricted to closed premises. Only the shape of the object can be determined. Because of the characteristics inherent to the method, the colors of the object are spoilt by the processing. The processing is complex, and as a result that type of system is for use by specialists only.

There exist systems and techniques for image processing that rely on manual intervention to identify "remarkable" points. That solution is entirely software-based. Several photographs are taken of an object at various different angles by means of a camera. The images are then digitized and processed by suitable specific software. It is then necessary to identify manually on each photograph a maximum number of remarkable points that are common to all of the photographs, and, a priori, that operation is time consuming. The software then makes use of said points to position each photograph and to generate a three-dimensional image. That method presents a major advantage: pictures can be taken easily and quickly. However it is not free from drawbacks, and in particular it requires manual preprocessing that is laborious, as mentioned above, and the resulting accuracy is poor, as is inherent to any manual processing.

There also exist image processing systems and techniques that rely on tracking "remarkable" points. In that case also, specialized software is required. A space or an object is filmed using a video camera. Once the film has been digitized, remarkable points are selected in a particular image of the film. The same remarkable points are then identified in each image by a software method known as "point tracking". An image processing algorithm then enables the software to determine the position of each focal plane for each image and thus to make a three-dimensional model of the universe as filmed. The main advantage of that method is similar to the advantage of the preceding method: pictures are taken quickly and easily. Its disadvantages are likewise similar: lengthy image preprocessing, manual intervention required to eliminate errors, and poor accuracy.

There exist picture-taking systems with a rotary turntable. An object of small size (typically a few tens of centimeters) is placed on the turntable, which is caused to rotate at constant speed. A stationary camera is placed outside the turntable and films the object. Although that system presents genuine advantages: pictures are taken quickly and easily, image processing is simple, and accuracy is good, it can nevertheless be applied only to objects that are small in size.

Finally, mention can be made of picture-taking systems which include "mechanical" knowledge concerning the locations of the images. For that type of system, the location of the camera is known by means of a mechanical device on a rail or the like. In that case also, the system presents genuine advantages: pictures are taken quickly and easily, image processing is simple, and accuracy is good. Nevertheless like the preceding system it can only be applied to objects of small size. In addition, it turns out to be lengthy and expensive to implement.

From the above, the main characteristics of the prior art systems and methods mentioned above can be summarized as follows.

Firstly, it can clearly be seen that three-dimensional measurement using images takes place in two stages.

The first stage consists in image acquisition proper.

The second stage, generally referred to as "photogrammetric restitution" consists in arranging the recorded images appropriately and in applying an image processing method to said arrangement (which method may be of the mechanical and/or computer type), with one of the main purposes thereof being to establish the dimensions and the positions of the objects that have been photographed. By extension, it is then possible to make a three-dimensional model of the objects.

Systems and methods exist which enable good accuracy to be achieved concerning the positions of the photographs, but in the present state of the art, those methods are expensive, requiring complex infrastructure, and therefore difficult to implement (and indeed relying on specialists) and there are constraints on the size of the object that is to be modelled.

There also exist systems and methods that extrapolate image position information directly from image processing. Implementation is simple, but the accuracy of the resulting data generally turns out to be too coarse, and manual intervention is also generally needed. As a result, processing is slow and subject to error.

As a general rule, the resulting difficulties are such that, in practice, use is made of systems based on laser telemetry. Such systems have the advantage of measuring the dimensions of elements constituting objects, but they also have the unavoidable drawback of being too coarse compared with traditional images and of being incapable of processing color information, specifically because laser sources are used.

OBJECTS AND SUMMARY OF THE INVENTION

The invention seeks to mitigate the drawbacks of prior art systems and methods, some of which are outlined above.

The aim of the invention is to provide a system for three-dimensional modeling and restitution of an object, which system is lightweight and self-contained, and in particular implements the above-described photogrammetric technique.

The system of the present invention enables a large number of images to be acquired in sequence together with their main parameters concerning movement and picture-taking.

The data acquired is suitable for accurate three-dimensional modeling, while nevertheless being simple, quick, and not very constraining to implement, and without putting any limit on the object that is to be measured and modelled.

The three-dimensional modeling performed by means of the system of the invention can be stored, transmitted, and/or integrated in other applications, in particular for the purpose of building up a virtual three-dimensional universe and allowing an operator to navigate within said virtual three-dimensional universe.

Such navigation can be performed in two main ways:
statically: it is well known that a three-dimensional model allows a stationary user to observe objects that have been modelled from different angles using a pointing system and three-dimensional restitution software; and
dynamically: the invention also allows a user to move at sight in a three-dimensional universe that has already been modelled. Each shift of viewpoint is dynamically taken into account by positioning sensors. The image is plotted by three-dimensional rendering software.

To do this, according to a first major characteristic, the system constituting a preferred embodiment of the invention comprises a first subsystem combining in a single assembly (e.g. in a housing provided with a handle) a device for acquiring a sequence of images, the device comprising at least one video camera and two sets of inertial type sensors, advantageously based on gyros and accelerometers, respectively.

The second subsystem essentially comprises members and circuits for signal processing, advantageously of the type for processing digital data by means of a stored program, possibly associated with an electrical power supply.

Still in a preferred embodiment, the two subsystems communicate with each other via a cable having electrical and/or optical connections (optical connections being by optical fiber).

Overall, the system is in the form of a system that is lightweight and self-contained, transportable by an operator who can thus move in a measurement field that is a priori of large dimensions.

As a result, in addition to the practical aspect of the system (compact, transportable, etc.), modeling is not restricted to objects of small dimensions, which limitation is inherent to some of the prior art systems outlined above.

It is explained in detail below how the measurements obtained can be very accurate and how the apparatus does not need to be handled by an expert, since it is simple to operate.

In addition, it does not require additional accessories such as optical targets, etc., nor does it require multiple prior operations and/or processing (positioning the above-mentioned targets, etc.).

Finally, the processing is entirely automatic (no marking of points on images, no manual corrections).

In a more preferred variant embodiment of the invention, additional members may be combined with the basic members of the first subsystem, e.g. for the purpose of obtaining additional measurement accuracy and/or for making the first subsystem easier to handle.

In particular, it is possible also to provide a global positioning system (GPS) device, an initialization terminal for acquiring initial reference coordinates in a measurement field, an infrared video camera, a laser source, a microphone, a display device, etc.

The invention thus mainly provides a system for three-dimensional modeling and restitution of a subject of a determined scene in a three-dimensional space, the system comprising:
a first subsystem comprising, placed in a single housing that is portable for an operator, at least one video camera for acquiring sequences of digital images of said subject, co-operating with first and second series of measurement means generating measurement signals measuring the attitude, location, and displacement of said video camera relative to three axes in a three-dimensional frame of reference, said first and second series of measurement means each comprising devices generating measurements relative to each of said axis in said frame of reference;
a second subsystem comprising at least digital data processor means receiving the data signals characterizing said sequences of acquired digital images and said measurement signals measuring the attitude, location, and displacement of said video camera in said frame of reference, and responding to said data signals of acquired digital image sequences and said location and displacement signals to generate a three-dimensional model of said subject; and
connection means between said first and second subsystems, said connection means conveying at least said data signals of acquired digital image sequences and said location and displacement signals.

The invention also provides a method implementing the system.

BRIEF DESCRIPTION OF THE DRAWINGS

The invention is described below in greater detail with reference to the accompanying drawings, in which:

FIGS. 2A to 2D are diagrams of the various subassemblies making up a system constituting a preferred embodiment of the invention for three-dimensionally modeling and restitution an object;

MORE DETAILED DESCRIPTION

Figure 1:
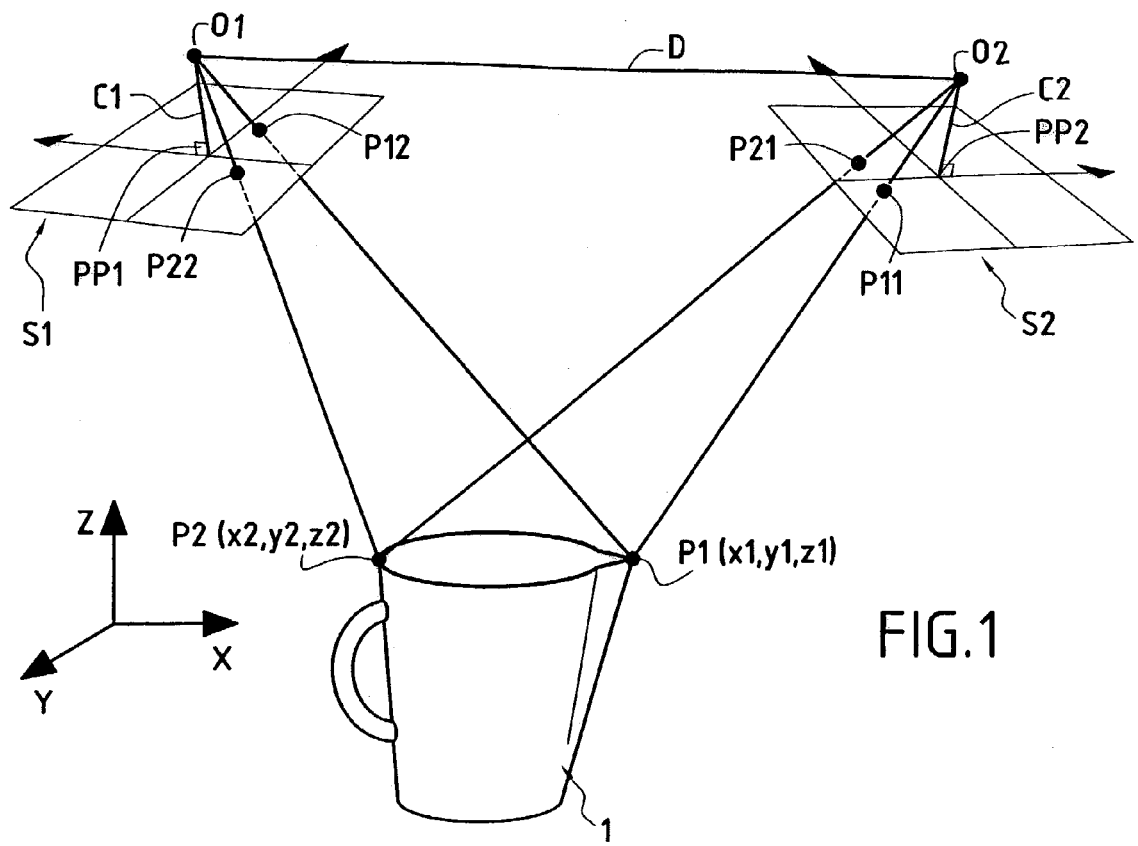
FIG. 1 is a diagram showing a conventional photogrammetric method.

There follows a description of the system for three-dimensionally modeling and restitution an object constituting a preferred embodiment of the invention, given with reference to FIGS. 2A to 2D.

To simplify the description, terms such as "three-dimensional" or "in three dimensions" are replaced below by the abbreviation "3D".

In the figures, elements that are identical have the same references and are described again only where necessary.

FIG. 2A is a diagram of that which is referred to below as the "first" subsystem 2 in a system of the invention.

This subsystem 2 is essentially constituted by a housing 3 similar in appearance to a video camera, a camcorder, or the like. The housing 3 comprises a rigid cell 30 advantageously made of magnesium alloy, thus ensuring that it is both rigid and lightweight. In conventional manner, the shell is provided with a bottom handle 31.

The first subsystem 2 comprises firstly, in the housing 3, optical elements.

There are provided a first optical unit 32a for taking pictures in natural light (i.e. polychromatic light). A semiconductor sensor of the charge-coupled device (CCD) type is preferably used. By way of concrete example, a 5 megapixel sensor is provided. It is also advantageous to provide interchangeable lenses (not shown) of different focal lengths that are preset to the hyperfocal position.

In a preferred embodiment, a second optical unit 32b is provided that is identical to the preceding optical unit and that is servo-controlled to the first on an articulated arm (not shown) which is internal or preferably external to the housing 3.

A thermal optical unit 33 is also provided, e.g. including a focal plane matrix of the non-cooled microbolometer type, e.g. comprising 320×240 elements each measuring 8 micrometers (μm) by 12 μm.

The optical assembly may be associated with a main integrated light projector 39a mounted on an articulated arm 390a, e.g. a 1000 lumen lamp, together with a telemetry and scanning laser 34 having a typical capacity of 1000 points per second, for example, with measurement uncertainty of the order of 1 millimeter (mm) for an object that is 5 meters (m) away.

According to an important characteristic of the invention, the locating elements are disposed in the same housing 3 as the optical elements and thus move synchronously with the optical elements, and in particular with the first optical unit 32a.

More precisely, the first subsystem 2 mainly comprises at least two series of elements for measuring the attitude, location, and travel speed, and specifically it comprises at least one gyro 35 and at least one accelerometer 36 placed inside the housing 3.

In the context of the invention, the term "attitude" is used generically to cover parameters concerning the roll, the pitch, and the azimuth (or yaw) of the housing 3, i.e. more particularly of the optical assembly 32a–32b, and of the other members (when they exist): i.e. the thermal optical unit 33 and the telemetry and scanning laser 34.

In practical manner, each of the series 35 and 36 respectively of elements for measuring the attitude, location, and travel speed, preferably comprises three individual members so as to be able to perform measurements in three dimensions (said members being aligned on three distinct axes to constitute a frame of reference).

By way of practical example, the accelerometer 36 may be based on a trio of silicon accelerometers based on vibrating blade technology.

The gyro 35 may be based on three orthogonal coils of monomode optical fiber, the coils typically having a diameter of 80 mm, and each having about 1 kilometer (km) of optical fiber. It is also possible to use vibrating gyros.

These base elements may be associated with auxiliary members (not shown specifically), in particular a rotary tri-flux magnetometer, two perpendicular inclinometers on the main plane of the apparatus, or inclinometers that at least have axes that are offset, and a GPS module given reference 38.

Still in a preferred embodiment, additional measurement sensors are provided, and in particular:

a quartz precision clock, having a display 391c in a side panel 39c of the shell 30 of the housing 3; and an internal temperature sensor (not shown).

Advantageously, the housing 3 is provided with "man-machine" interface elements, and in particular:

pushbuttons and rotary knobs (e.g. for adjusting the rate at which remarkable points and images are acquired), given overall reference 390c, being located on the side plane 39c;

a microphone/loudspeaker 37;

an indicator for establishing the drift of the position sensors of the apparatus (not shown); and a display member 39b mounted on an articulated arm 390b, advantageously a liquid crystal display, e.g. having resolution of 400×300 pixels.

The second subsystem 4 is constituted by a device referred to below as a "service housing". In a preferred embodiment, it is in the form of a backpack 40 or the like, capable of being transported by an operator OP, e.g. by means of straps 41. In a "non-operational" mode (i.e. not involving the operations of acquiring and processing signals in order to obtain a 3D model), it is advantageous to provide a slot (not shown) in the backpack 40 for receiving the housing 3.

In an operational mode, the housing 3 is taken out from the backpack 40 and held in the hand M by the operator OP.

More precisely, and as shown diagrammatically in FIG. 2C, the service housing 4 contains a set of members and circuits that are arbitrarily installed together on a chassis 42 for placing in the backpack 40.

The main members and circuits contained on the chassis are as follows:

an electrical power supply battery 420, e.g. a lithium battery delivering 12 volts (V) and having a capacity of 10 ampere-hours (Ah), and an associated chopper power supply unit 421, so as to avoid using heavy transformers: the power supply delivers a set of output voltages and/or currents of appropriate amplitudes and is given overall reference VS;

a unit 422 for processing digital data by means of a stored program, said unit being of the microcomputer type and including various conventional members required to enable it to operate properly (not shown), such as a microprocessor, central memory, etc., and in particular a 3D video card;

a mass memory 423, for example constituted by two magnetic hard disks, each typically having a capacity of 80 gigabytes (GB);

a display unit 424 controlled by the above-mentioned 3D video card;

data input devices such as a keyboard 425 and a pointer device 426: mouse, trackball, etc., for inputting comments, data, synchronization instructions, or processing instructions;

electronic circuits 427 for processing the signals generated by the optical fiber gyros, interfaced with the microcomputer 422 via a suitable electronic circuit card (e.g. a serial port); and input/output ports for handling various protocols and electronic interface circuits leading to external devices: "IEEE 1394" or "firewire", "USB", "VGA", video, sound, "bluetooth", "ethernet", "wireless", "802.11", etc., together given a single reference 428.

Connectors 429 are also provided for making a connection via a cable 5 (FIG. 2B) between the housing 3 (FIG. 2B) and the chassis 42. A priori, the cable 5 carries three main categories of signal: electronic signals over wires 50 (e.g. a serial bus, or the like), electrical power supply signals 51, and optical signals over optical fibers 52, e.g. coming from the optical fiber gyros 35 (FIG. 2A). Corresponding connectors (not shown) are provided at the housing 3 (FIG. 2A). Naturally, other types of link could also be provided: radio links (e.g. using the above-mentioned "bluetooth" protocol) and/or direct optical links (signals modulating an infrared carrier, for example), between the housing 3 and the elements in the service housing 4.

In addition to these two main subsystems, it is advantageous to provide a third subsystem of auxiliary elements essentially constituted by an initialization terminal 6 shown in FIG. 2D, and where necessary in certain applications, a set of optical targets. In the example shown in FIG. 2D, the initialization terminal 6 is in the form of a tripod 60 similar to a photographic tripod, having a support 61 secured thereto, e.g. of tubular shape, the support terminating at its top end in a tapering portion 610. With reference again to FIG. 2A, it can be seen that in the example described, the handle 31 has a recess of shape that is complementary to the shape of the top portion 61 of the initialization terminal 6. This enables the handle 31 and thus the housing 3 to be engaged on the top portion 61 of the initialization terminal 6. The purpose of such a member is explained below.

Figure 3:
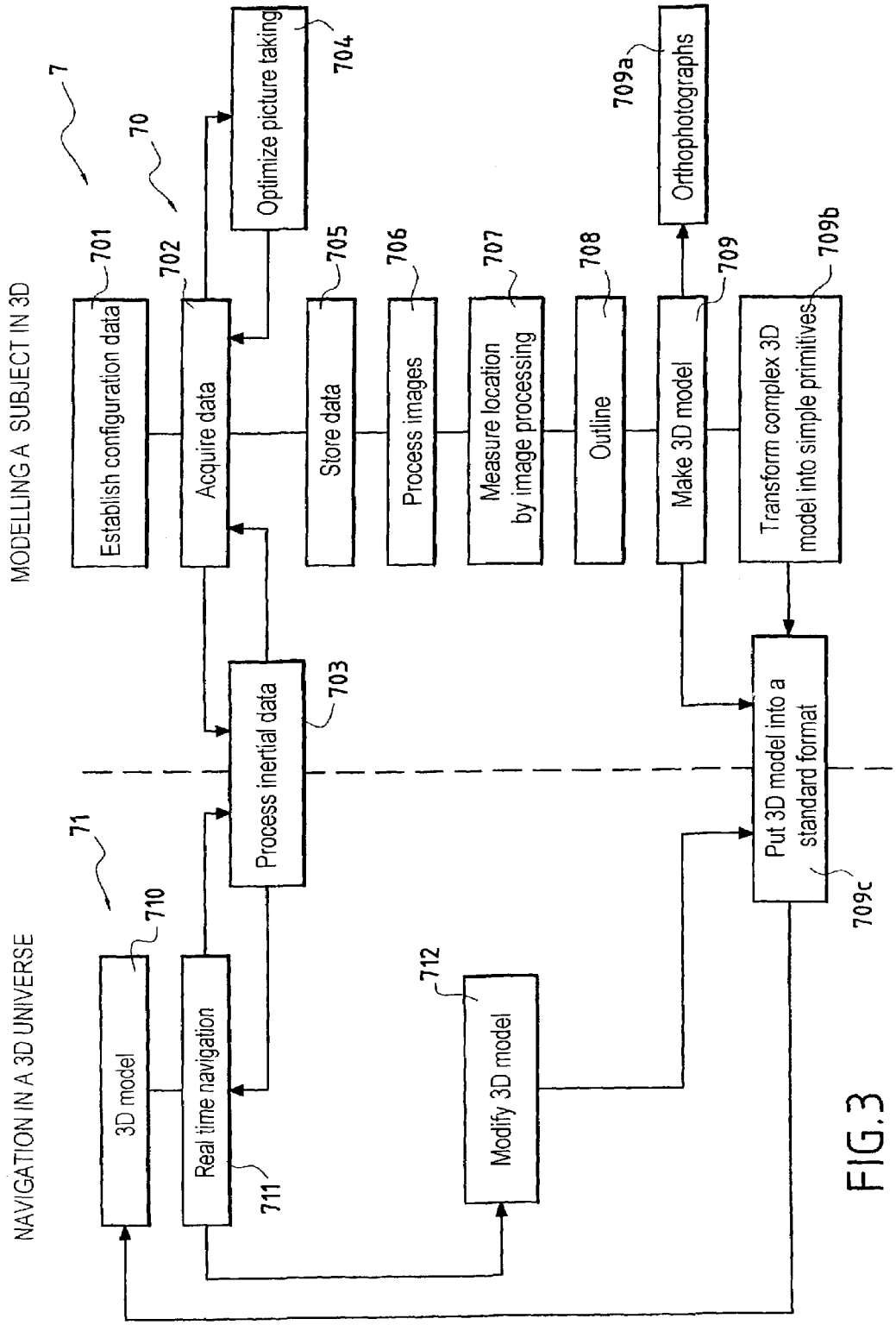
FIG. 3 is a flow chart showing the main stages and steps in the method of three-dimensionally modeling and restitution an object by implementing the system shown in FIGS. 2A to 2D.

There follows a description of the main stages and steps in the method of making a 3D model and plot of an object, and more generally of a scene (referred to below as a "subject"), implementing the system of the invention as described above, this description being given with reference to FIG. 3. FIG. 3 is a flow chart 7 showing the steps of the method. Its right-hand portion, referenced 70, relates to modeling a 3D subject.

The first or preliminary step 701 consists in initializing configuration data and recording them in the system.

A configuration description is integrated, for example, in the form of a configuration system file of the text type. This file contains information relating to the hardware and the software in use. Certain parameters can be reconfigured. The main parameters relate to the following:

An optical correction table relating to the optical sensors, and in particular to the lenses. Special lenses are used, and in particular lenses that are specifically designed to obtain images with very few errors. An optical correction table taking account of the various distortions and aberrations of the image is established in a laboratory, and this table is included in the configuration file. This correction table enables optical errors to be compensated by computer processing (chromatic aberration, spherical aberration, coma, astigmatism, field curvature, distortion, . . . ). The table may nevertheless be reconstructed in situ by the operator, in particular to take account of particular conditions of use (temperature, etc.) and it can be re-input into the system. The operator OP can reconstruct an optical correction table as follows: starting from a plurality of sets of targets (not shown), a large number of images are required at regular values for focal length and aperture, with the positions of the unit 3 relative to the targets being known by using the positioning sensors. This data is analyzed by the software and it delivers the correction tables which are subsequently introduced into the system.

The coordinates of the above-mentioned principal point $PP(i0, ç0)$: to do this, the optical sensors are tested in the laboratory in order to determine accurately the exact location of this principal point. This information is also integrated in the system.

Models concerning corrections for the inertial sensors: as data is acquired, models predicting the behavior of the inertial sensors are refined by methods for algorithmically processing data.

The second step 702 consists in acquiring data. It is more specific to the method of the invention.

This step consists in acquiring the information needed for 3D modeling. All of this information is advantageously time-stamped.

Reference is made again to FIG. 2A, except where stated otherwise. The information concerned is as follows:

1/ A point forming the center of the frame of reference for modeling is acquired using the initialization terminal 310 and 6-61 (FIG. 2D).

2/ The directions and the brightnesses of existing light sources are determined using the housing 3 (FIGS. 2A and 2B).

3/ Digital sequences of images (a priori polychromatic images) are delivered by the main sensor 32a. These image sequences may be taken under the control of the operator or in automatic manner. If they are taken automatically, the rate at which pictures are taken can be adjusted, e.g. of the range 1 image per second to 100 images per second, by acting on the buttons 390c.

4/ Digital image sequences are also supplied by the second image sensor 32b (stereoscopic mode). These images are synchronized with those taken by the first sensors 32a.

5/ Thermal image sequences are supplied by the infrared video camera 33. These images are synchronized with the digital images.

6/ Data is supplied by the gyros 35: rotation increments $\Delta\alpha$, $\Delta\beta$, and $\Delta\gamma$ about the three axes of the three gyros are acquired and stored in a temporary register (not shown), e.g. at a frequency of 200 hertz (Hz).

7/ Data is delivered by the accelerometers 36: translation increments written $\Delta x$, $\Delta y$, and $\Delta z$ along the three axes of the three accelerometers are acquired and stored in a temporary register (not shown) e.g. at a frequency of 200 Hz.

8/ Data is supplied by the two inclinometers (not shown): this data may be acquired at a frequency of 10 Hz, for example.

9/ Position data is supplied by the GPS module 38: absolute GPS position data is acquired at a frequency of 5 Hz, for example.

10/ Telemetry data is supplied by the laser 34: laser telemetry data is acquired at a frequency of 1000 Hz, for example.

11/ Temperature data is supplied: internal temperature data is acquired at a frequency of 1 Hz, for example.

12/ Sound commentary data is acquired asynchronously by the microphone 37 to constitute sound sequences.

13/ Data is supplied by the tri-flux magnetometers (not shown): this magnetometer data is acquired and timestamped synchronously with the digital images.

14/ Optical parameter data is acquired concerning the focal length, scanning speed, diaphragm aperture, and focus distance. This data is acquired synchronously with the images that are taken.

15/ User control data input by the operator OP (FIG. 2B): user commands are acquired as and when they are given.

The third step 703 consists in processing the inertial data.

This step serves in real time to process the location acquisition data and to establish the movements of the apparatus (housing 3) when transported by the operator OP. As suggested by the chart of FIG. 3, this step is iterative (return to step 702).

The position of the video camera unit is determined by the locating elements of the inertial navigation type, i.e. essentially based on the signals generated by the gyros 35 and the accelerometers 36. Processing of this type is known, per se, and is explained in particular in the following objects:

"Inertial navigation system analysis", by K. R. Britting (1971) published by Wiley-Interscience, New York; and "Inertial navigation systems", by C. Broxmeyer, published by McGraw Hill (1964).

After a determined time lapse, resetting is performed on a terminal that was used as the reference point. The difference between measurements and the reference point is determined. This difference is spread over the various prior location measurements so as to compensate for measurement error.

Redundancy signals are obtained using auxiliary position-locating sensors in the housing 3, i.e. other sensors for establishing location and distance: GPS 38, magnetometers, inclinometers, and possibly also odometers. The estimated drift of the various position sensors of the apparatus (housing 3) is conveyed to the operator OP. These measurements are also corrected by the image processing in the subsystem 4 (FIGS. 2B and 2C).

This type of processing is well known per se and is explained in particular in the following objects:

"Integrating differential GPS with an inertial navigation system (INS) and CCD cameras for a mobile GIS data collection system", by N. El-Sheimy and K. P. Schwarz published in 1994 in "Proc. the Canadian Conference on GIS", Ottawa, Canada, June 6–10, pp. 241–248;

"Evaluation of GPS-inertial navigation system for airborne photogrammetry" by Q. Abdulah published in 1997 in "ASPRS/MAPPS Softcopy Conference", Arlington, Va., July 27–30;

"Exterior orientation by direct measurement of camera position and attitude" by J. Skaloud, M. Cramer, K. P. Schwarz, published in 1996 in "XVII. ISPRS Congress", Vienna, Austria, July 9–19, "Int. Archives of Photogrammetry and Remote Sensing", Vol. 31, Part b3, pp. 125–130, 1996; and "Denoising of signals in inertial navigation systems (INS) using wavelets"by A. M. Bruton, J. Scaloud, K. P. Schwarz (in preparation, 1999b).

The inclination of the housing 3 of the video camera unit (azimuth, elevation, and roll angles), and consequently the inclination of the space seen in the image plane, is given mainly by the frame of reference defined by the three gyros 35 placed on three distinct non-coplanar axes.

The electronics 427 (FIG. 2C) associated with the gyro sensors 35 delivers rotation increments $\Delta\alpha$, $\Delta\beta$, and $\Delta\gamma$ about three distinct axes. On the basis of these increments, the angular positions $\alpha$, $\beta$, and $\gamma$ are calculated by changing the frame of reference using arithmetical computations known as "quaternions".

The position (x, y, z) of the video camera unit 32a–32b, and consequently the position of the center of each image, is supplied mainly by the frame of reference defined by the three accelerometers 36.

The distances traveled along each of the three axes (x, y, z) are calculated by successive integrations making use of calculations of dynamics based on the acceleration data supplied by the frame of reference constituted by the three accelerometers 36. The accelerometers 36 and the gyros 35 co-operate to enable location data to be computed, for example at a frequency of 200 Hz.

The movements of the housing 3 of the video camera unit is computed on a continuous basis by means of numerical integration algorithms that are known per se (for example the "Range Kutta" and the "Adam" predictor-corrector algorithms) in order to interpolate intermediate points between the positions at which two pictures are taken.

It is generally necessary to take account of two factors when computing movements in a Euclidean frame of reference. These two factors are firstly the roundness of the earth, and secondly its speed of rotation.

In order to compensate for errors due to the roundness of the earth, it is commonplace to use gyro correction so as to take account of curvature of the earth during movements in translation, particularly when such movements are of large amplitude.

In order to compensate for drift due to the acceleration of the earth, it is necessary to integrate latitude and speed data so that the apparatus automatically decrements the values that are added by so-called "Coriolis" acceleration. For this purpose, latitude and speed are automatically taken into account by relying on the GPS module.

It is also known that the values coming from the gyros drift over time in particular as a function of temperature and of magnetic field. It is generally necessary to perform calibration operations, both statically and dynamically on the gyros.

It is also known that the values delivered by accelerometers drift, in particular with oscillation of about 84 minutes, also known as "Schuler's law", and because of Coriolis acceleration (the "Foucault" effect) which depends on the latitude and on the speed of the moving body.

To correct for these kinds of drift, it is advantageous to use very high precision gyros co-operating with gravity sensors. Devices of this type are capable of determining the axis of rotation of the earth and thus of determining the direction of geographical north and the direction to the center of terrestrial gravitation. In this way, it is possible to reset inertial type sensors automatically.

In order to compensate the above-mentioned "Schuler" drift, measurements are taken from the accelerometers over a period of longer than 84 minutes. This initialization time serves to determine the characteristics of the "Schuler" period for each accelerometer of the set 35. On the basis of these characteristics, and using synchronization by means of an electronic clock, the value of the period is decremented at all times from the results given by the accelerometers.

To compensate for errors due to the "Schuler" and "Coriolis" laws, predictive modeling is used based on so-called "Kalman" filters.

To compensate for drift due to an inertial navigation unit, resetting is performed on the terminal that acts as the reference point at the end of a predetermined lapse of time. For this purpose, the initialization terminal 6 (FIG. 2D) is used which is placed in the measurement field at a predetermined location. The top portion 61 of the terminal 6 is engaged in the handle 31 of the housing 3, the top portion 61 being inserted in the enclosure 310. The difference is determined between measured position and the reference point as determined by the position of the terminal 6. This difference is spread over the various prior measurements in order to compensate for measurement errors.

Measurements are performed on the gyros 35 and the accelerometers 36 under various conditions. These measurements are input into software running on the microprocessor 422 (FIG. 2C) having the function of modeling the behavior of the gyros 35. Errors are compensated in real time by taking account of the model.

The acquisitions performed using the auxiliary sensors (measurements of the earth's magnetic flux as supplied by the magnetometers, measurements supplied by the GPS unit 38, measurements supplied by the inclinometers) serve in real time or in deferred time to correlate trajectory information.

In a preferred embodiment, the system is capable of interfacing with auxiliary positioning systems, and in particular:

Account is taken of information coming from odometers if the apparatus is used on a vehicle fitted with an odometer.

Account is taken of information supplied by a rotary laser: three optical reference targets (not shown) are installed around the zone to be modelled, for example. The laser identifies them several times per second. It can thus determine its position. This measurement is accurate over zones of several tens of meters. It can be used to correct measurements from the inertial navigation unit.

A three-dimensional locating system can be added that relies on generating an electromagnetic or an electrostatic field.

The position of the video camera can be determined by image processing.

All the methods seeking to provide additional information for improving the locating of images can be combined. Redundant information is most advantageous for increasing the amount of information available and thus establishing correlations.

In order to take advantage of such redundancy, it is possible to use conventional "gradient descent" algorithms or quadratic programming type algorithms (e.g. of the "Karmakar" type or the "More and Toraldo" type or the "Markhov" model type, etc.) so as to obtain an almost certain value for each looked-for parameter, in spite of the errors in the raw measurements. These algorithms also serve to eliminate deviant values and to reconstitute missing values.

These principles are known in themselves and they are explained in particular in:

"Numerical recipes in C++" (Jan. 15, 2002) by William H. Press (editor), Saul A. Teukolsky (editor), Brian P. Flannert (editor), and William T. Vetterling, in "The Art of Scientific Computing".

The fourth step 704 consists in optimizing the images taken. As suggested by the diagram of FIG. 3, this step is iterative (return to step 702).

This step serves to correct in real time parameters concerning panning speed, light sources, and shaking of the housing 3, so as to be able to minimize the aperture of the objective lens 32*a*–32*b*. It is known that the smaller the aperture of a lens, the greater the depth of field. Each lens has a sharpness optimum for a given aperture. It is therefore necessary to control the size of the aperture while pictures are being taken as thoroughly as possible while ensuring that enough light passes to illuminate the image.

In a preferred embodiment, the following optimizations are performed:

Optimization of lighting: the intensity of the light projector 39*a* is automatically adjusted as a function of ambient lighting.

Optimization of picture panning speed: the scanning speed of the optical sensor 32*a*–32*b* for taking pictures is optimized on the basis of the apparent angular velocity of the subject being photographed. To determine the apparent angular velocity of a stationary subject, it is necessary to know the speeds in rotation and in translation of the objective lens, with this information being obtained from the inertial navigation unit; it is necessary to know the distance to the subject, with this information being provided by a telemeter, for example (laser telemeter 34, ultrasound telemeter, stereoscopic video camera: use of two lenses 32*a* and 32*b*); and it is necessary to know the focal length. The panning speed when using an electronic CCD type sensor is optimized so as to be as long as possible without leading to details being degraded in the image by the "smearing" effect.

A problem which makes it more difficult to measure location is the way the housing 3 containing the apparatus shakes while it is being held in the hand M of the operator OP. This method of operation gives rise to noise in the measurements. Studies have shown that such shaking generally occurs at a frequency of about 10 Hz, with amplitude being limited to a few tenths of a degree. Measurements coming from the gyros 35 and the accelerometers 36 enable the above-mentioned shaking to be quantified and compensated. The optical portion, in particular the lenses 32*a*–32*b* (and possibly also the infrared lens 33) is mechanically damped in order to attenuate such vibration.

The fifth step 705 consists in storing the acquired data.

The image are advantageously characterized by the following parameters associated therewith:

the physical configuration of the system;

time-stamping: the precise instant at which each picture was taken;

location: six coordinates for image position;
movement: acceleration, speed, and trajectory;
focal length: type of focal length used or zoom position;
position to which focusing distance is set;
main distance;
picture-taking speed: exposure time for each image;
aperture while taking pictures;
brightness while taking pictures in one or more zones;
temperature;
estimation of measurement error from the gyros 35 and the accelerometers 36;
coordinates of the main point PP(i0, ç0); and
sound files.

This data is integrated in a database and recorded in the storage means provided in the service housing 4 (FIG. 2C): hard disks 423.

The sixth step 706 consists in the images being processed by the digital data processor system using a stored program, i.e. by the microcomputer 422 (FIG. 2C).

The purpose of this processing is to eliminate image information that is erroneous or of no use, thereby facilitating and accelerating the modeling process.

Step 706 is subdivided into substeps as follows:
Compensating for lens aberrations: the images are corrected by computer processing on the basis of the lens correction tables obtained in step 701 (the following are corrected: chromatic aberration, spherical aberration, coma, astigmatism, field curvature, distortion, . . . ). As mentioned above, this table may be reinitialized in the configuration file.
Images that are not of use are extracted: if the depth-of-field distances are not complied with when the lens is at a fixed (hyperfocal) setting, the subject is fuzzy and unusable; if the user takes pictures that are not associated with the scene to be modelled; if there is a back-lighting effect, etc.
Filtering subjects that are themselves moving. When taking pictures, moving elements give rise to parasitic measurement. By using the "tracking" method while processing the image, software can determine that the apparent trajectory of points it is tracking on a moving subject does not match the apparent trajectory of the background and of the video camera. Information and measurements relating to the moving subject are eliminated.
Determining the zone to be modelled: it is often unnecessary to model a space in full. A pointer can be used on a plurality of pictures to select which zones are to be treated.
Establishing an information hierarchy: zones with different levels of importance are defined on the subject to be modelled using a plurality of significant pictures. Zones of lesser importance are processed more quickly (less processing of redundancy). The size of the final model is correspondingly reduced.

The seventh step 707 consists in improving the picture-taking location measurements by image processing.

Locating the position of the housing 3 by image processing serves essentially to corroborate and to compensate for drift in the measurements provided by the gyros 35 and the accelerometers 36. The over-constrained location data is handled by so-called "gradient descent" algorithms or by quadratic programming, as mentioned above, making it possible to obtain almost certain values for the desired parameters in spite of measurement errors. These algorithms also serve to eliminate deviant values and to reconstitute missing values.

As a general rule, the location errors generated by an inertial navigation system vary as a function of time: and in particular, the longer the length of time since the sensors were initialized, the greater the measurement error. Measurements closest to the moment of initialization are therefore more accurate. As a result of this observation, it is assumed that 3D modeling performed on the basis of the first images to be taken after initialization of the sensors is more accurate, so this modeling can advantageously serve as a reference for the remainder of the processing to be performed thereafter. If while scanning a zone to be modelled by the subsystem 2 it happens that measurements made during the initial instants are repeated, then it is the earlier measurements that have priority. The observed differences between the measurements can be used to compensate in part for the errors in trajectory accumulated over time. When modeling in real time, the subsystem 2 dynamically resets the inertial navigation system as a function of the differences between the measurements.

It is possible to further refine the accuracy with which picture viewpoints are located by selecting reference points in the acquired image. Reference points are remarkable points on the subject to be modelled which are identified in as many of the pictures as possible. Analyzing these remarkable points provides information concerning the positions from which the pictures were taken.

A well-known software type tracking method is used for identifying remarkable points in a succession of images, given that the images are taken from a video or from a sequence of images in which the pictures succeed one another in order. It is known that that method is presently the subject matter of study and industrial implementation, however its reliability is often at issue under difficult circumstances, particularly when the above-mentioned remarkable points are not sufficiently different from adjacent points. The method of the invention makes that method considerably easier and more reliable since the characteristics of the image (coordinates of the image plane, . . . ) are already known with some precision from the above-described physical locating means. It follows that the software need "search" only in a well-defined region of the image.

The tracking method provides help in locating images:
It makes it possible automatically to process a large number of reference points: the greater the number of reference points, the better the degree of refinement that is obtained.
In order to perform refined analysis of the trajectory, a laser telemeter 38 is used for measuring the distance between the housing 3 and a point on the object that is to be modelled. This point whose distance is now known in the space being modelled is automatically taken as being a remarkable point. It is therefore a point that is tracked. Analyzing curves showing the positions of reference points over time makes it possible to determine accurately the movement of the reference points relative to the housing 3. If the modeling is being performed on space that is stationary, it becomes very easy to determine the movements of the housing 3 itself. It is possible in this way to correct the measurements provided by the gyros 35 and the accelerometers 36.

A robust solution for obtaining reference points on images is to install optical targets (not shown) around the subject that is to be modelled. These targets are advantageously fitted with light-emitting diodes (LEDs). Also advantageously, provision is made for each LED to emit at a distinct wavelength (color), and for each of these diodes to emit a different code (word). Their positions in the acquired images are recognized automatically.

The eighth step 708 consists in outlining processing. Various outlining operations can be undertaken, alone or in combination:

The outlining step serves to consolidate measurements of the locations of points that form part of the outlines of subjects. To do this, it is advantageous to use the infrared video camera 33. The images coming from the infrared video camera 33 perceive only the spectrum coming from bodies that emit heat. Under normal circumstances, the infrared video camera 33 detects a closer subject (a closer source of heat) more clearly than a remote subject (a distant source of heat). It is therefore possible to extrapolate depth of field differences between subjects.

The use of a stereoscopic video camera 32a–32b makes it possible to determine differences in depth of field and thus to improve automatic outlining.

Scanning by means of the laser telemeter 34 provides information concerning depth of field differences between different subjects in the same scene.

Outlining by image processing can also be used. In general, the outline of a given subject is more or less uniform in color. On the basis of this observation, the pixels of images situated at the outlines of objects are detected, and pixels whose colors are close to the color of the object outlined are filtered.

Manual focusing can also be performed. The outlines of subjects to be outlined are traced in well-distinguished pictures. Outline tracing can be performed pixel by pixel or by using so-called "Bezier" curves or the like. The points of outlines are then considered as being remarkable points and the trajectories thereof are tracked by the conventional video tracking method.

The ninth step 709 consists in 3D modeling proper.

The main purpose of the system of the invention is to provide accurate and corroborated information (images and measurements) enabling a subject to be modelled (in the broad meaning of the term, as mentioned above), essentially by the photogrammetric technique. This step is performed by computer using software for computer-assisted photographic interpretation (CAPI).

Figure 4:
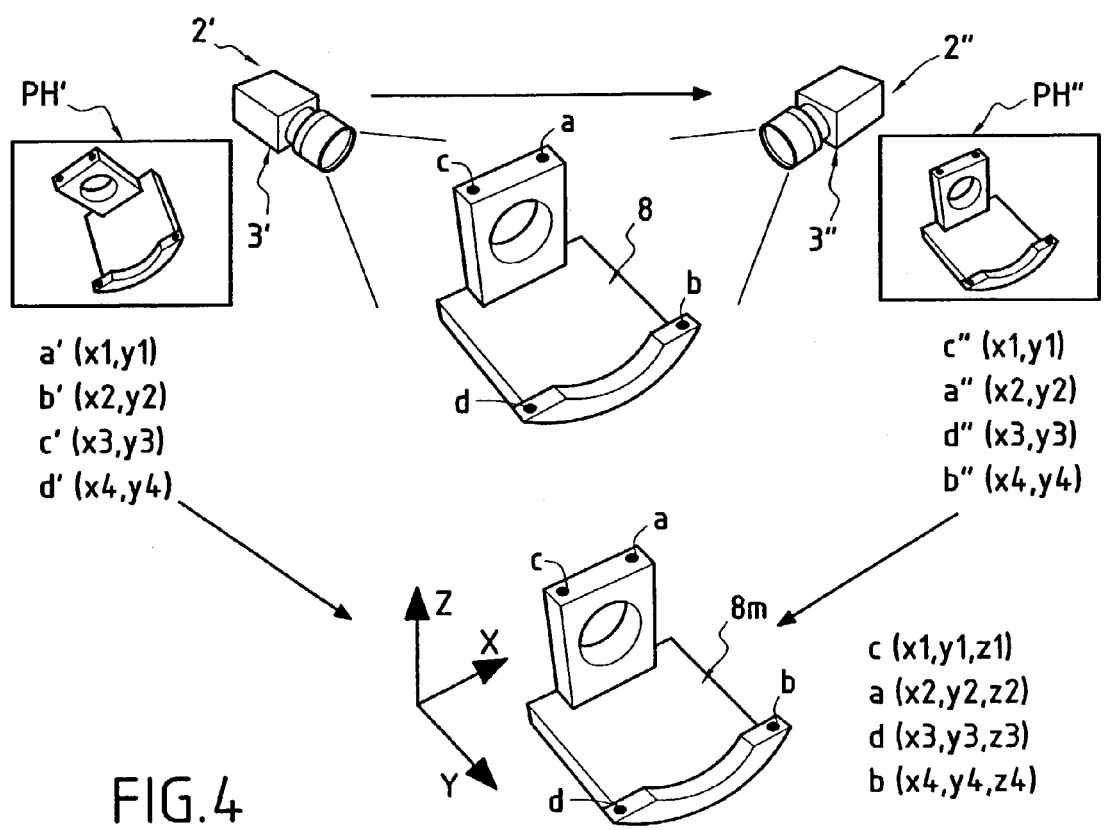
FIG. 4 shows more particularly the modeling step proper.

FIG. 4 is a diagram showing the main operations that enable a 3D model to be obtained of a given subject, specifically a mechanical part 8.

It is necessary to take at least two photographs from distinct angles in order to be able to model this mechanical part 8 in 3D: i.e. obtain a model 8m in a reference space defined by an orthogonal frame of reference XYZ. In FIG. 4, the two positions taken by the first subsystem, i.e. the housing, are referenced 2'–3' and 2"–3", respectively. Two two-dimensional photographs are thus obtained given respective references PH' and PH", and it is then possible to construct the 3D model 8M from those photographs.

By way of concrete example, in FIG. 4, there are four points on the subject 8 referenced a, b, c, and d which are to be found in both photographs, in photograph PH' these points have two-dimensional coordinates a' (x1, y1), b' (x2, y2), c' (x3, y3) and d' (x4, y4), while in photograph PH" these points have two-dimensional coordinates a" (x2, y2), b" (x4, y4), c" (x1, y1) and d" (x3, y3). Once combined, these four points are to be found in the model 8m where they have 3D coordinates a(x2, y2, z2), b(x4, y4, z4), c(x1, y1, z1) and d(x3, y3, z3).

Modeling is based essentially on the photogrammetric technique described with reference to FIG. 1.

The information supplied comprises essentially the corrected photographs PH" and PH" of the subject 8 characterized by nine parameters enabling central projections to be performed:

location: i.e. six coordinates determining the positions of the images;

the principal distance c; and the position of the principal point PP($i0$, $ç0$).

Advantageously, all of the methods seeking to provide additional information to help in modeling subjects can be combined. Redundant information is most advantageous for increasing the amount of information and thus enabling correlations to be performed. Modeling is improved in particular by:

Remarkable points whose measured positions have been verified and consolidated.

A large number of characterized images. The locations of points on the model are computed several times on different grounds. The accuracy with which points of the model are known is improved by statistical methods (the least squares method, Gaussian method, statistical regulation, etc.). Reference can advantageously be made to the book by J. C. Culioli entitled "Introduction à l'optimisation" [Introduction to optimization] published in 1994 by Editions Marketing, in the "Ellipses" series, Paris.

Measurements obtained by the method of outlining the subject.

Data obtained by scanning using telemeters (laser beam or ultrasound). This data is very useful, in particular for measuring subjects that are translucent or views that give little color contrast.

Analysis by projecting light on the subject.

Using so-called "datamining" algorithm or artificial intelligence to show up inconsistencies between measurements and to fill in missing measurements.

This step 709 terminates the 3D modeling process proper using the system of the invention. Nevertheless, the resulting model enables additional operations and results to be achieved.

Modeling from images also makes it possible to create "orthophotographs" as shown in step 709a.

The technique of "orthophotograpy" serves to rectify an image or a photograph to match the relief of the object it represents on the basis of a mathematical model of said object.

Certain well-known image-processing tools enable a digital photograph of a plane object to be rectified. That type of rectification generates an orthogonal projection of constant scale on a single plane. When the object is not accurately plane, such rectification leads to significant loss of accuracy or indeed to deformation. The method of "orthophotograpy" enables a photograph to be rectified on the basis of the 3D model, i.e. to convert from a conical perspective to an orthogonal projection on a defined scale. The known technique of differential rectification is used.

It is also possible to transform the 3D model obtained in step 709, which is generally a complex model, into primitive models that are simpler.

In numerous applications, it is useful to resolve the 3D model into simple primitives: a plane, a sphere, a cylinder, a torus, a cone, etc.

This step referenced 709b enables models to be obtained that are compact in terms of storage memory requirements and that present the following additional advantages:

it is possible to obtain very fast 3D rendering;

it is possible to trace CAD plans from real objects; and it is very easy to manage the 3D universe, as a general rule.

It may also be useful, in particular for the purpose of exporting data to other software, to convert the 3D model into a standard format. This step is referenced 709c.

Advantageously, once the subject has been modelled in 3D, the software that was used for modeling it enables the model to be exported in various standardized 3D drawing formats, using techniques that are well known.

Such models can be used in applications that make use of three-dimensional representations, and in particular in:

computer-assisted design (CAD);

video games; and

"virtual reality" and "multimedia".

Also in advantageous manner, a 3D model makes so-called "navigation in a 3D universe" possible. Such a method is represented by the left-hand portion referenced 71 of the flow chart in FIG. 3.

The first step referenced 710 is acquiring a 3D model.

This is a method which is self-contained, since it is possible to start from a 3D model obtained by a system and a method different from those of the invention, which model is referred arbitrarily as being "external". In the context of the invention, the 3D model is obtained by implementing the system of the invention (where such a model is referred to arbitrarily as being "internal"), and by using all or some of the above-described steps for modeling a subject: i.e. as described with reference to the right-hand portion 70 of the flow chart 7. It is also clear that "external" and "internal" models can be combined to obtain "composite" models, as described below.

The second step referenced 711 is constituted by navigation proper in a three-dimensional universe.

In order to view a 3D image from a model that has already been established, it is necessary initially to define the plane in which the picture is to be taken in the frame of reference in the three-dimensional model. To define this plane, it is necessary to determine the position of the origin point from which the picture is taken and also its focal length. 3D rendering software then computes all of the points of the image.

The system and the method of the invention enable the position of the origin point for the picture to be determined by means of positioning sensors, in particular the sensors 35 and 36 (FIG. 2A) and by data processing means 4 (FIGS. 2B and 2C). The processing is similar to that of step 703: i.e. processing inertial data. As a result, step 703 is shown as being common to both methods.

A processor provided with 3D rendering software operates in real time to compute each image. The processor may be part of the stored program digital data system 402 (FIG. 2C). A screen optionally secured to the system projects the computed images, for example the display screen 404 (FIG. 2C).

This process makes the following possible, in particular:

a user can be given the option of moving at sight in the 3D universe of the model: each movement or inclination in viewing angle is taken into account dynamically by the processing for 3D image rendering;

to move at sight in the 3D universe of the model in a place other than in the three-dimensional volume in which modeling took place; and/or to move at sight in any compatible 3D model created by other modeling applications.

It is also possible to modify the 3D model while navigating therein, as represented by the step referenced 712, and optionally to put into a standard format as described above (step 709c).

The ability to navigate in the space that has been modelled serves in particular:

to verify the quality of the modeling: after performing the modeling step 709, the operator OP (FIG. 2B) can immediately observe errors by superposing the 3D image as rendered (as displayed on the screen 404, FIG. 2C) with the real subject (scenery, etc.);

to perform new modeling conditionally if poorly-defined locations exist;

to set the 3D model accurately relative to the real subject using appropriate software tools: this may serve to correct for possible errors in localization during the modeling step 709;

to modify, optionally in situ, the 3D model to stretch it, simplify it, smooth it, extrude it, etc. using numerous software tools that are known in themselves;

to segment various portions of the model: one of the traditional problems with automatic 3D modeling is being able to distinguish between elements which constitute the subject (scenery, etc.) and in particular to be able to allow an operator to distinguish between elements judged to be necessary by using a pointing system (for example when modeling a room in an apartment, it can be appropriate to distinguish the main pieces of furniture and also the doors and windows constituting the room); and/or to verify coherence in the event of the 3D model being transformed into primitives (step 709b).

The system and the model of the invention can be applied in numerous domains, including the domains listed below in non-exhaustive manner.

A first application lies in indoor architecture, in particular with application to interiors that are to be subject to renovation work.

In general, it is necessary in succession: to measure the dimensions of the space that is to be renovated, to take photographs, to integrate the measurements, and to work on the modifications using CAD software, and finally to present the result of the work to the client in the form of a plan and a synthesized image.

In typical manner, in accordance with the method of the invention, and implementing the system described with reference to FIGS. 2A to 4, an architect: positions a small setting terminal (similar to the terminal 610 of the device 6, FIG. 2D) which serves as a reference and initialization point for the inertial navigation system; puts the housing 3 (FIG. 2A) via its handle 31-310 (FIG. 2A) on the terminal 610 (FIG. 2D); and then uses the subsystem 2 (FIG. 2A), i.e. the housing 3 held in the hand M (FIGS. 2A and 2B), to scan the scene as can be seen around the operator.

Steps 701 to 709 of the flow chart 7 are then performed, or at least those steps are absolutely essential for obtaining a model of the space concerned, and preferably all of the steps.

Once a complete 3D model has been obtained, the architect records it in a commercially-standard 3D format (step 712). The architect can then work on it using the architect's preferred CAD software.

The method of the invention makes it possible in particular for the architect to save a large amount of time since at the end of the 3D modeling process, the architect has available:

all of the photographs that are going to be needed;

all of the measurements required for working on the space; and the ability to work using 3D software directly on a space that has already been modelled, so all the architect needs to do is modify it (e.g. step 712).

In general, in the prior art, an architect presents the result to a client in the form of plans, isometric views, and synthesized images. The invention makes a new form of presentation possible.

A client can move about in a physical space (real scene) while looking at a display screen, for example the screen 404 (FIG. 2C), with the view on the screen moving simultaneously in virtual manner in a virtual space representing the new decor, optionally modified on site by the architect or else as modified at a distance therefrom.

The invention is also applicable to archaeology: archaeologists need to take careful measurements over the zones or "digs" that they investigate, and they must do so without running the risk of damaging the site.

The system and the method of the invention satisfy this need since they enable measurements to be performed quickly and without making contact with the zone under investigation. In addition, archaeologists often need to make 3D models of the field of their investigations. The system and the method of the invention enable the desired locations to be modelled automatically. Archaeologists also often need to perform orthophotograpy, and the invention makes that possible also (step 710). Finally, archaeologists need a tool enabling the zone of the dig to be viewed without running the risk of damaging the site: the system and the method of the invention make it possible to move about in and visit the zone in virtual manner once it has been modelled.

Another application lies with surveyors: the system and the method of the invention enable surveyors to make measurements in particular of ground level contours in rough ground with a very significant saving of time.

Numerous other fields of application that can be referred to as being "general" are also concerned by the invention, and these include:

inspecting works of art;
measuring volumes in mines and quarries;
the automobile industry (bodywork);
hydraulics (waves, water movements, etc.);
reporting accidents, in particular road accidents;
drawing up CAD plans;
quality control;
machining in the general sense;
establishing design measurements;
making architectural surveys; and
making archaeological surveys.

On reading the above description, it will readily be understood that the invention does indeed achieve the objects it set out to achieve.

The system and the method of the invention present numerous advantages, as specified in the introduction to the present description.

Without repeating all of those advantages again, the system is particularly simple to implement, and as a result it does not need to be operated by an expert. It is portable, and by its design, it can be manipulated by hand, at least so far as the very lightweight first subsystem is concerned that is used for acquiring the images and data required for 3D modeling, with the heavier components being placed in the second subsystem which may be portable using a backpack or the like, or which may be placed on the ground if the expected displacements are of small amplitude only. A connecting cable can be provided between the two subsystems that is relatively long. The system does not require arrangements or components to be used that are particularly expensive.

Nevertheless, these dispositions do not harm the quality of the measurements taken or the resulting 3D model, as explained above.

It should be clear that the invention is not limited to the particular embodiments described explicitly, in particular with reference to FIGS. 2A to 4.

In particular, the measurement device that generates attitude signals, locating signals, and speed signals concerning the housing containing the optical video camera unit is implemented on the basis of gyros and accelerometers in a preferred embodiment. Nevertheless, in certain applications, in particular when the subject to be modelled is very large (landscape, etc.), the locating and speed measurement signals as generated by a GPS device may present sufficient accuracy. In an embodiment that is not described, it is thus possible to associate a GPS device with one or more inclinometers so as to acquire all of the signals required for measuring attitude, location, and speed as are needed for generating a 3D model, combining them with the signals associated with acquiring digital images.

In another embodiment (not described), it is also possible to replace the GPS device with a system based on beacons placed at determined locations of coordinates that are known relative to the scene which is to be modelled and which transmit a magnetic field that is encoded in appropriate manner. The magnetic field and the associated code are detected by at least one sensor carried by the housing. The signals needed for locating the housing are derived from the signals that are picked up. The accuracy with which commercial systems that are presently available can determine location is of the order of 1 centimeter, and of one-tenth of a degree, for distances not exceeding 20 meters.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A system for three-dimensional modeling and restitution of a subject of a determined scene in a three-dimensional space having three axes in a three-dimensional frame of reference, the system comprising:

a first subsystem comprising, at least one portable video camera configured to acquire sequences of digital images of said subject, first and second series of measurement devices cooperating with said at least one portable video camera and generating data measurement signals relative to each of said axes in said three-dimensional frame of reference, so as to characterize the attitude, location, and displacement of said at least one portable video camera relative to said three axes in said three-dimensional frame of reference;

a second subsystem comprising at least a digital data processor configured to receive signals characterizing said sequences of acquired digital images and said data measurement signals, and responding to said received signals characterizing said acquired sequences of digital image and said data measurement signals to generate a three-dimensional model of said subject; and connection means coupled between said first and second subsystems, said connection means configured to convey at least said signals characterizing said acquired sequences of digital images and said data measurement signals, and wherein said first series of measurement devices further comprises a trihedron of three gyros, each gyro being in alignment with one of said axes of said frame of reference; and said second series of measurement devices further comprises a trihedron of three accelerometers, each accelerometer being in alignment with one of said axes of said frame of reference.

2. A system according to claim 1, wherein said at least one portable video camera comprises a semiconductor charge-coupled device that is sensitive to polychromatic light together with interchangeable objective lenses of different focal lengths.

3. A system according to claim 1, wherein said first and second series of measurement devices comprise locating means configured to operate on electromagnetic signals transmitted by global positioning system ("GPS")-type artificial satellites configured to generate signals for locating said acquired sequences of digital images.

4. A system according to claim 1, wherein said first and second series of measurement devices comprise at least one magnetic sensor responsive to coded signals transmitted by magnetic beacons, said magnetic beacons disposed at determined locations of known coordinates relative to said frame of reference.

5. A system according to claim 1, wherein said first subsystem further includes at least one inclinometers configured to generate signals for correlating with at least the data measurement signals corresponding to the location of said at least one portable video camera generated by said first and second series of measurement devices.

6. A system according to claim 1, wherein said first subsystem further includes at least one mono- or multi-flux magnetometer configured to generate signals for correlating with at least the data signals corresponding to the location of said at least one portable video camera generated by said first and second series of measurement devices.

7. A system according to claim 1, further comprising a third subsystem, said third subsystem including:

at least one coordinate-initializing device comprising a support, and configured to determine initialization coordinates, said at least one coordinate-initializing device being placed at a determined location in said scene of coordinates known relative to said frame of reference, and wherein said system further includes a housing for transporting said first subsystem and, said housing including an initialization terminal for coupling in temporary manner with said support so as to reset said measurement devices on said initialization coordinates.

8. A system according to claim 1, wherein said first subsystem further comprises:

a second portable video camera, identical to said first portable video camera, and servo-controlled thereto on an articulated arm so as to acquire said sequences of digital images of said subject using a stereoscopic method, and wherein data signals characterizing said acquired sequences of digital images are transmitted to said digital data processor, and are used to facilitate "outlining" operations on the images in which the points constituting the outlines of determined objects in said images are detected.

9. A system according to claim 1, wherein said first subsystem further comprises an infrared video camera configured to acquire digitized thermal images of said subject, and wherein data signals characterizing said acquired digital thermal images are transmitted to said digital data processor, and used to facilitate "outlining" operations on the images in which the points constituting the outlines of determined objects in said images are detected.

10. A system according to claim 1, wherein said first subsystem further comprises a telemeter.

11. A system according to claim 1, further comprising:

a first housing configured to house said first subsystem and a second housing configured to house said second subsystem, said second housing being of a type suitable for placing in a bag of the backpack type for transport by an operator;

an electrical power supply configured to power said digital data processor and said first subsystem via said connection means; and said digital data processor comprises;

at least a microcomputer co-operating at least with a storage device configured to store said signals received from said first subsystem together with determined stored programs for processing purposes;

interface and matching members configured for use with said received signals;

a data input; and a display for displaying data processed by said microcomputer and for displaying said three-dimensional model.

12. A method of modeling and restitution in three dimensions, a subject of a determined scene in a three-dimensional space having three axes in a three-dimensional frame of reference, the method comprising:

recording a video using at least one portable video camera to acquire digital image sequences of said subject, and generating data measurement signals, comprising at least two series of signals characterizing attitude, location, and displacement data of said at least one portable video camera;

transmitting said signals characterizing said acquired digital image sequences and said data measurement signals characterizing the attitude, position, and displacement of said at least one portable video camera to an associated digital data processor;

storing data from said transmitted data signals in a store associated with said digital data processor; and processing said signals by determined software under the control of said digital data processor so as to generate a three-dimensional model of said subject by combining said data associated with said signals characterizing said acquired digital image sequences and said data signals characterizing the attitude, location, and displacement of said at least one portable video camera while recording said video, and wherein the generating data measurement signals is performed by:

a first series of measurement devices including a trihedron of three gyros, where each gyro is aligned with one of said axes of said frame of reference; and a second series of measurement devices including a trihedron of three accelerometers, where each accelerometer is aligned with one of said axes of said frame of reference.

13. A method according to claim 12, further comprising, after said step of storing said transmittal data, using determined software under the control of said digital data processor to perform an "outlining" operation so as to increase the accuracy with which points are determined that characterize the outlines of determined objects contained in said acquired digital image sequences.

14. A method according to claim 12, further comprising resetting said data measurement signals, said resetting being performed by a determined software processing operation on the images acquired by the video recording so as to compensate for drift of said data measurement signals.

15. A method according to claim 12, further comprising measuring angular speed of said subject so as to acquire signals for adjusting parameters associated with said recording a video.

16. A method according to claim 12, further comprising making photographs of an "orthophotographic" type on the basis of data associated with said three-dimensional models obtained by said digital data processor.

17. A method according to claim 12, further comprising iteratively navigating in a three-dimensional universe on the basis of said three-dimensional model so as to verify parameters that have been determined for said three-dimensional model, and so as to undertake conditional modification of said three-dimensional model as a function of the result of said verification, by acquiring new digital image sequences and new data measurement signals.

18. A method according to claim 12, further comprising, while recording said video, acquiring redundant signals characterizing said digital image sequences and/or said data measurement signals so as to improve the accuracy of said measurements by determined signal processing.

* * * * *